United States Patent [19]

St-Germain

[11] Patent Number: 5,151,610
[45] Date of Patent: Sep. 29, 1992

[54] WIND MACHINE WITH ELECTRIC GENERATORS AND SECONDARY ROTORS LOCATED ON ROTATING VERTICAL BLADES

[76] Inventor: Jean St-Germain, 1364 rang St-Georges, St-Simon de Bagot, Canada, J0H 1Y0

[21] Appl. No.: 619,423

[22] Filed: Nov. 29, 1990

[51] Int. Cl.⁵ .............................................. F03D 9/00
[52] U.S. Cl. .................................................... 290/55
[58] Field of Search ................................... 290/44, 55

[56] References Cited

U.S. PATENT DOCUMENTS

| | | | |
|---|---|---|---|
| 4,291,235 | 9/1981 | Bergey et al. | 290/44 |
| 4,503,673 | 3/1985 | Schachle et al. | 290/44 |
| 4,537,542 | 11/1982 | Kirschbaum | 290/44 |

Primary Examiner—A. D. Pellinen
Assistant Examiner—Lawrence E. Colbert
Attorney, Agent, or Firm—Pierre Lespérance; Francois Martineau

[57] ABSTRACT

Each vertically rotating blade of a wind-driven main rotor carries a secondary rotor oriented to be driven by the wind during its circular motion about the main rotor axis. The secondary rotors are thus exposed to a much increased relative wind speed and transmit torque to a rotary energy-producing device, such as an electric generator directly coupled to the shaft of the secondary rotor without the necessity of a speed-up transmission. Each secondary rotor may be located, in line with the chords of the main rotor blade, anywhere along said blade but, preferably, in the vicinity of the blade tip.

11 Claims, 8 Drawing Sheets

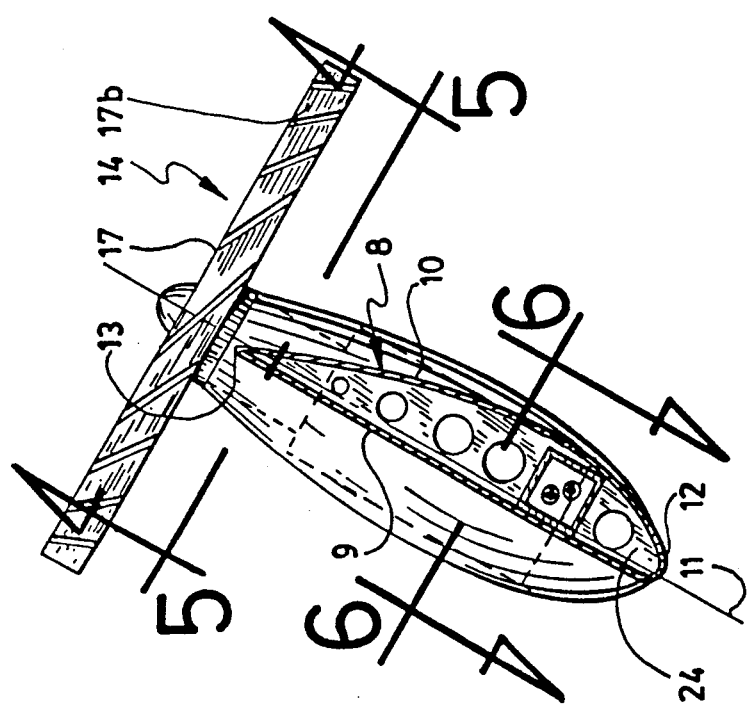
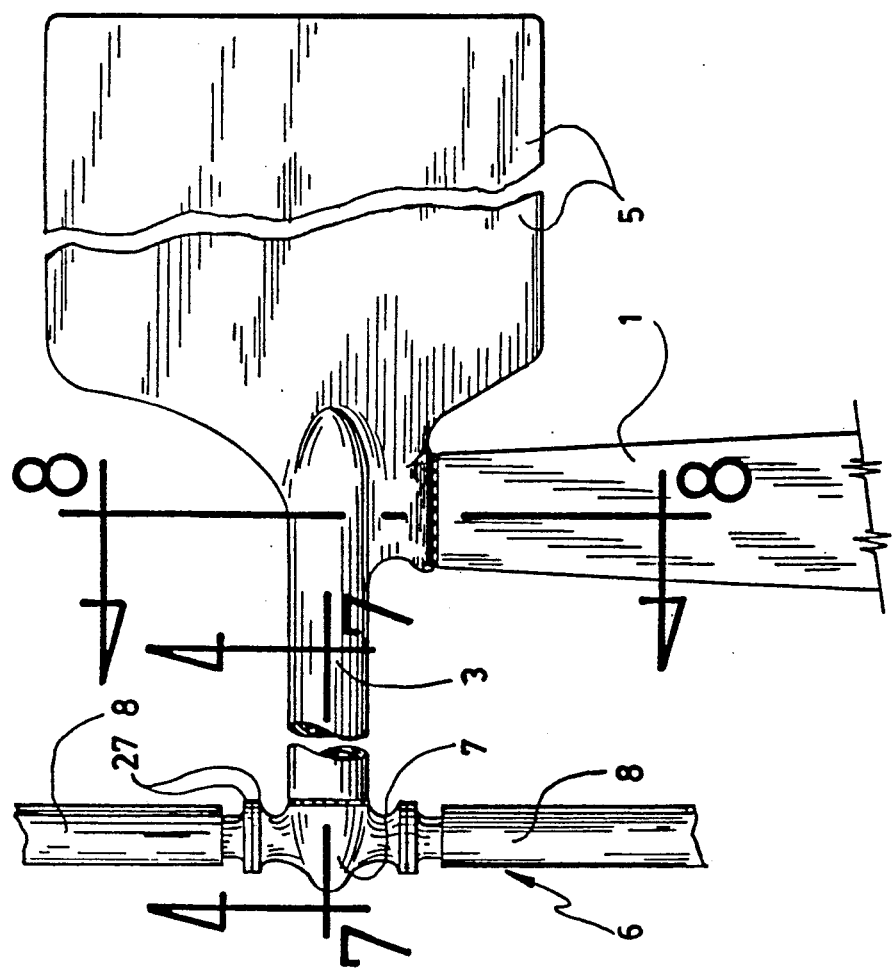

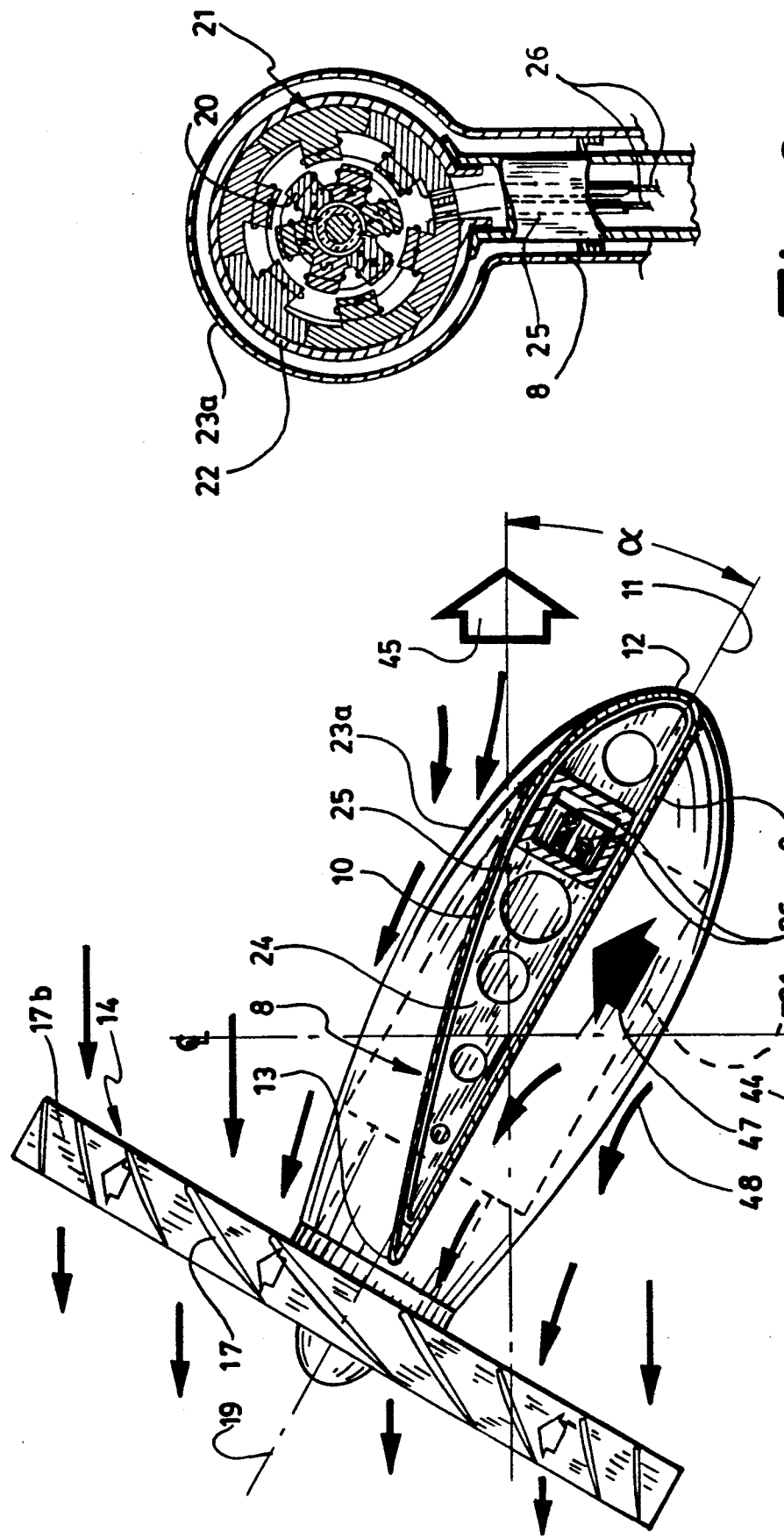

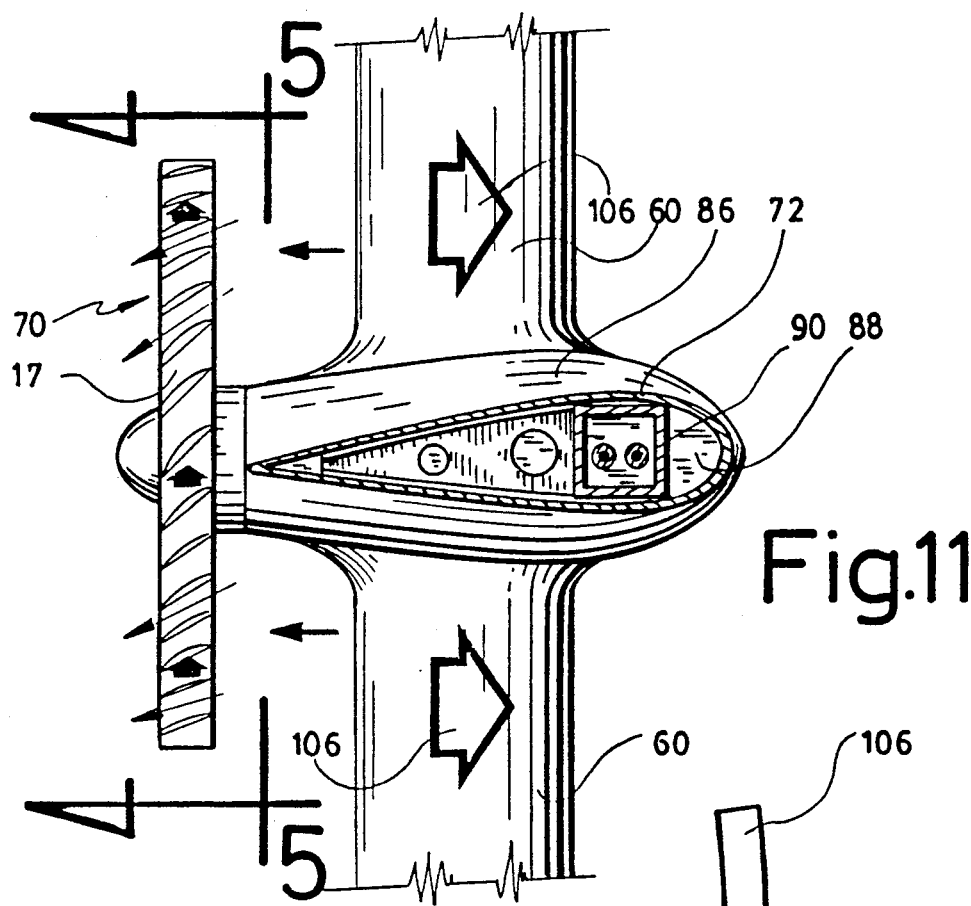
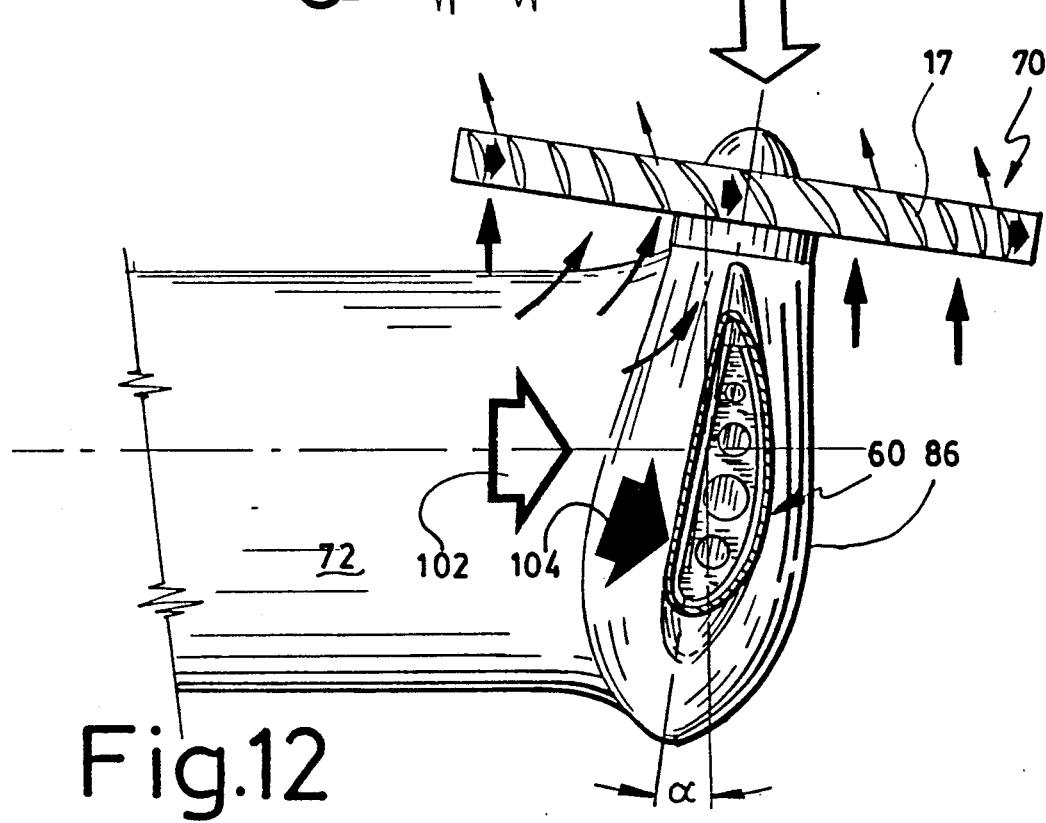

WIND MACHINE WITH ELECTRIC GENERATORS AND SECONDARY ROTORS LOCATED ON ROTATING VERTICAL BLADES

FIELD OF THE INVENTION

The present invention relates to wind machines, that is windmills and the like wind-driven rotors, adapted to produce energy, such as electricity.

BACKGROUND OF THE INVENTION

Existing windmills with a horizontal axis and of the propeller type, and also of the egg-beater type with vertical axis and arranged for generating electricity, require a speed-up transmission. It is not uncommon to use a speed-up transmission having a ratio of 40 to 1 for driving an electric generator at around an optimum speed of 2,000 to 3,000 r.p.m., using a windmill rotating at about 50 r.p.m. Such transmissions are expensive to make, require considerable maintenance, often break down and considerably decrease the overall efficiency of the wind electric generator.

OBJECTS OF THE INVENTION

It is a general object of the present invention to provide a wind-driven machine which will obviate the above-noted disadvantage, especially when used as wind-driven electric generators.

SUMMARY OF THE INVENTION

The wind machine of the invention comprises a wind-driven main rotor rotatable about a main axis and at least two wind-driven secondary rotors carried by the main rotor and equally distant from and symmetrically arranged relative to said main axis and each rotatable about a secondary axis which is substantially normal to said main axis, whereby the main rotor serves to bodily move the secondary rotors in a circular path through the air at a much greater speed than the wind speed to which said main rotor is exposed. The diameter of the secondary rotors is much less than the diameter of the main rotor. The result is such that the rotational speed of the secondary rotor is much greater than the rotational speed of the main rotor and, consequently, the secondary rotors can be directly coupled to electric generators without the intermediary of a speed-up transmission. The invention is applicable to main rotors having vertical as well as horizontal axes. The blades of the main rotor are preferably made with an airfoil cross-section and the secondary rotors are axial flow rotors, such as turbines or propellers, with their axis substantially parallel to the chord of the airfoil type blade. Preferably, the axial flow secondary rotors are located at the trailing edge of the main rotor blades, so as to be additionally exposed to the air deflected off the flat intrados surface of the blade.

BRIEF DESCRIPTION OF THE DRAWINGS

FIG. 2 is a partial elevation taken along line 2—2 of FIG. 1;

FIG. 3 is a cross-section taken along line 3—3 of FIG. 1;

FIG. 3A is a view similar to that of FIG. 3, on an enlarged scale, and showing the various force components;

FIG. 6 is a cross-section taken along line 6—6 of FIG. 3.

FIGS. 11, 12, 13, 14, and 15 are sections taken along lines 11—11, 12—12, 13—13, 14—14, and 15—15, respectively, of FIG. 10.

DETAILED DESCRIPTION OF THE INVENTION

Figures 1, 4:
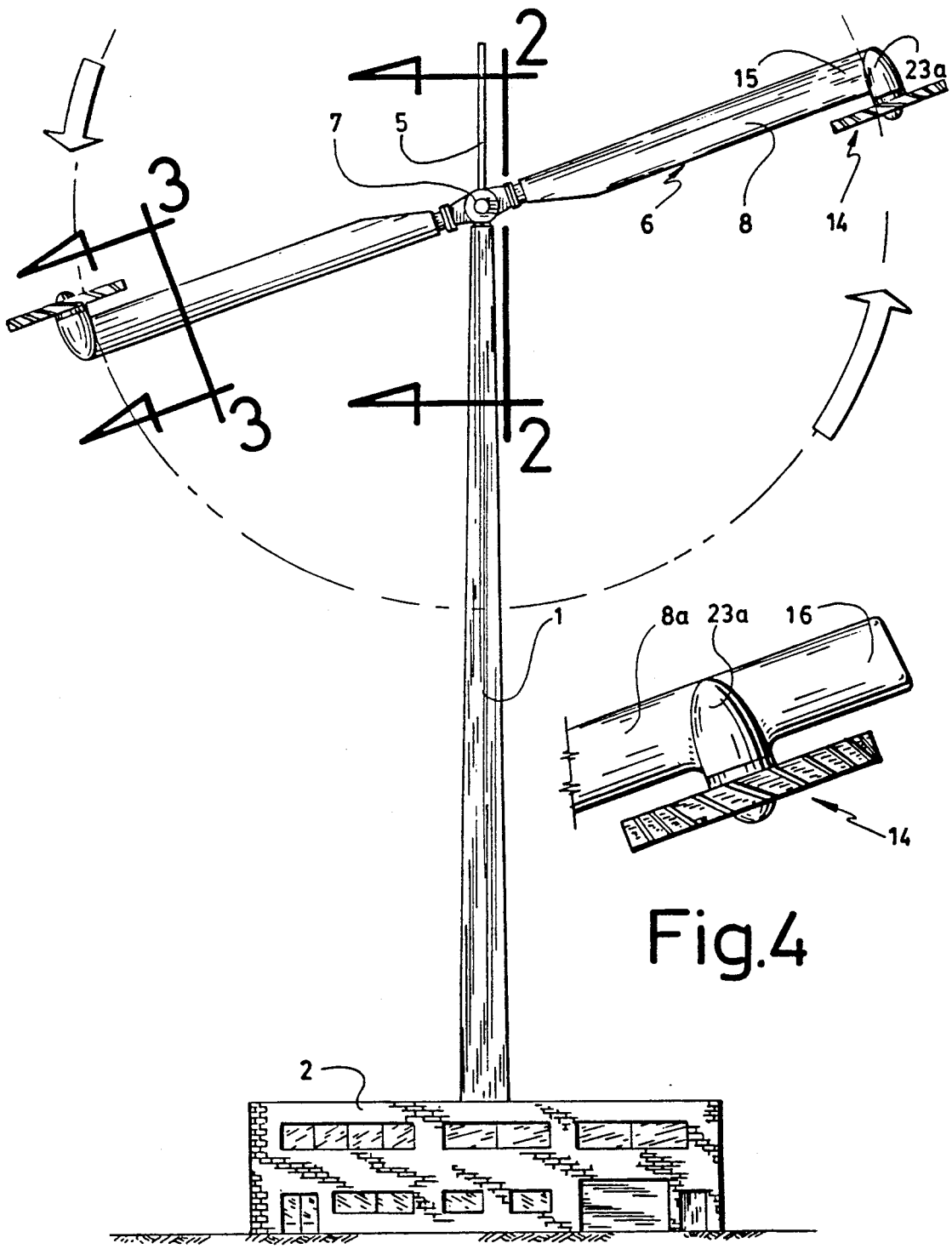
FIG. 1 is a front elevation of a wind machine in accordance with the invention.
FIG. 4 is a partial elevation of the tip portion of a main rotor blade showing a modified location of the secondary rotor.

Referring to FIGS. 1 and 2, the wind machine of the invention in accordance with a first embodiment comprises a high tower 1, which may be associated with a service building 2 and on the upper end of which is rotatably mounted a frame 3 for rotation about a vertical axis relative to the tower 1. If necessary, the tower 1 may be provided with guy wires. The frame 2 is of tubular shape and is provided with a tail vane 5 at its rear end, disposed in a vertical plane, while its front end serves to rotatably support a main rotor 6 through its hub 7. The main rotor 6 is rotatable about a horizontal axis and from its main hub 7 radially extends two or more blades 8, which may have, for instance, 15 feet or more in length. The blades 8 may be secured at a fixed pitch relative to the hub 7 or may be provided with a variable pitch mechanism. Each blade 8 may be longitudinally twisted for a lower cut-in wind speed. Each blade 8 preferably has an airfoil cross-sectional shape, shown for instance in FIG. 3, defining a flat intrados face 9 and a curved extrados face 10. The chord line 11 of the blade 8, starting from the leading 12 to the trailing edge 13 of the blade being parallel to the intrados 9.

The foregoing is of conventional construction. In accordance with the invention, a secondary wind-driven rotor 14 is carried by the tip portion 15 of each blade 8. The secondary rotor 14 can be carried right at the tip of the blade 8, as shown in FIG. 1, or anywhere along blade 8 but, preferably slightly inwardly of said tip, as shown in FIG. 4. In this figure, the blade is indicated at 8A and the tip of the blade at 16.

The rotor 14 is an axial flow rotor, that is it is driven by air flowing in a direction parallel to its axis of rotation. The rotor in the example shown is a multi-bladed propeller, such as a type known as a multi-blade American farm windmill, in which the blades 17 overlap each other in a frontal view and form a high frontal blade area to provide a high starting torque. As shown, a cylindrical shroud 17B may be fixed to the tips of blades 17 to form a duct for the air passing between the blades. However, the number of blades can be decreased down to a two-bladed propeller as shown by the propeller type rotor of FIG. 5A, if so desired, and in accordance with the local wind speed conditions and the design of the entire wind machine. The blades 17 or 17A are fixed to a shaft 18 (see FIGS. 5, 5A and 6) which is normal to the rotation axis of the main rotor 6. The secondary rotor axis 19 (FIG. 3a) substantially coincides with the chord line 11 and is therefore parallel to the intrados face 9. The shaft 18 directly carries the rotor 20 of an electric generator 21. The latter has its stator 22 fixedly mounted in a housing 23 carried by the blade 8 and located in a nacelle 23A, also carried by the blade 8 and of an aerodynamic shape.

Figure 5:
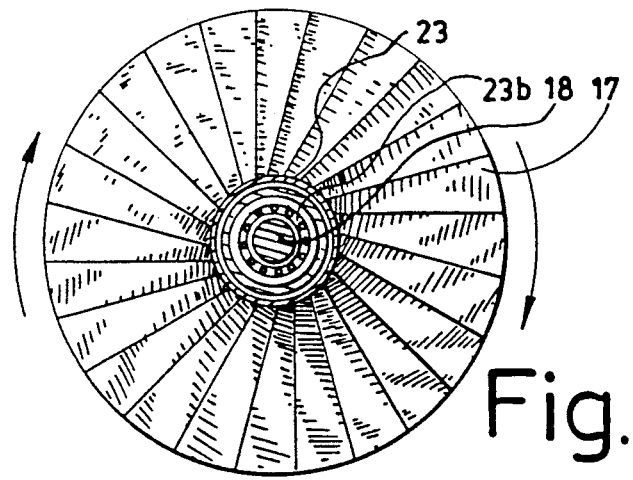
FIG. 5 is a section taken along line 5—5 of FIG. 3.
Figure 5A:
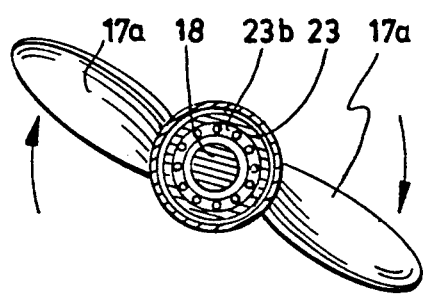
FIG. 5A shows a section similar to FIG. 5 but of a modified rotor.

Referring to FIGS. 5 and 5A, rotor shaft 17 extends through housing 23 and is supported therein by a bearing 23b. This generator 21 is either an A.C. or a D.C. current generator and its optimal speed is about 2,000 to 3,000 r.p.m. Thus, a standard generator can be used.

As shown in FIGS. 1, 3, and 3A, the secondary rotor 14 is located at the trailing edge 13 of the blade 8 and slightly rearwardly spaced therefrom.

Each main rotor blade 8 is of conventional air craft wing profile, for instance, being stiffened by a plurality of transverse partitions 24 and by a longitudinally-extending tube 25 through which the electric wires 26 coming from the generator 21 extend radially inwardly to the hub 7 of the main rotor 6.

Figure 7:
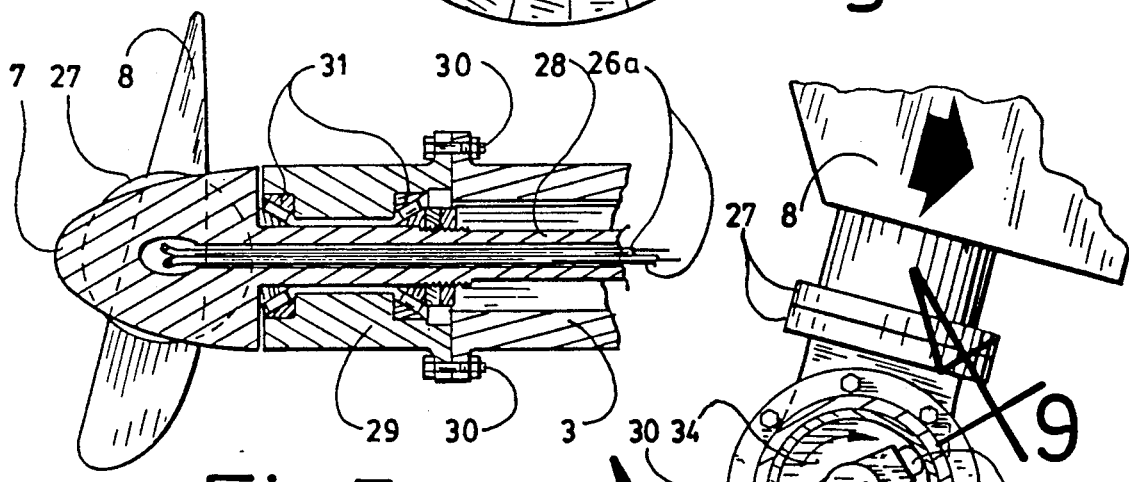
FIG. 7 and FIG. 8 are sections taken line 7—7 and 8—8 respectively in FIG. 2.

Referring to FIGS. 2 and 7, it is seen that each blade 8 is fixed to the hub 7 by inter-engaging flanges 27, which are bolted to each other. Referring to FIG. 7, it is seen that the hub 8 is integrally fixed to the tubular shaft 28 of the main rotor 6. This shaft 28 extends through the tubular frame 3 and also through a frame extension 29 fixed to the front of the frame 3 by bolts and nuts 30 and serving as a support for two frusto-conical roller bearings 31 rotatably supporting the front portion of the shaft 28.

Figure 8:
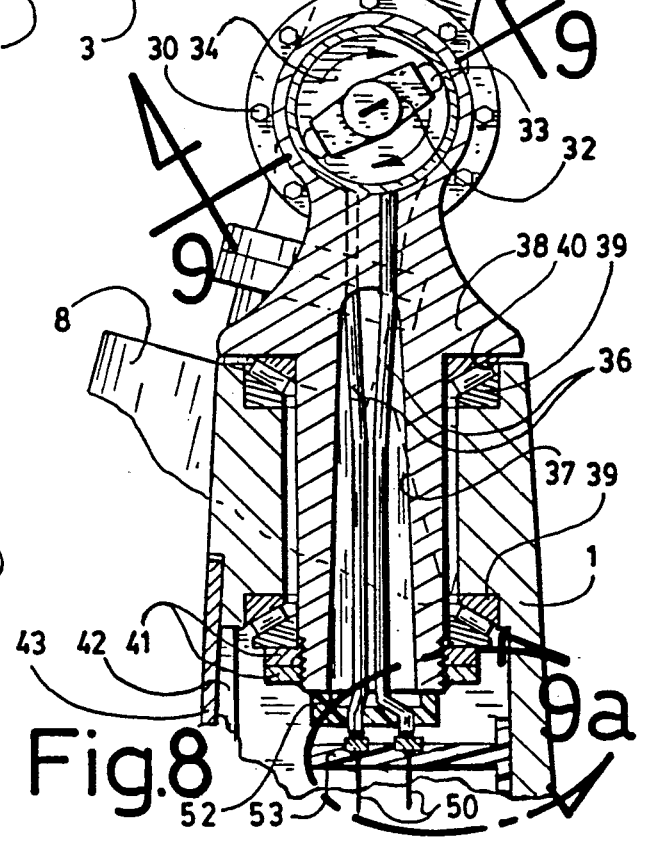
Figure 9:
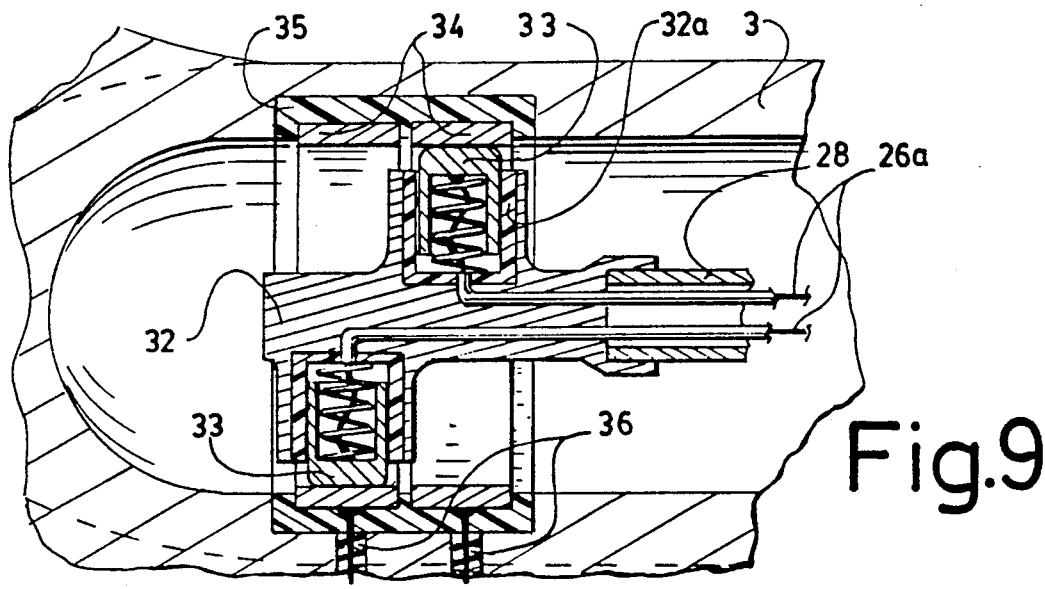
FIG. 9 is a partial section, taken along line 9—9 of FIG. 8.

Referring to FIGS. 8 and 9, it is seen that the tubular shaft 28 is extended rearwardly to the zone just above the tower 1. Its rear portion 28A is fixed to a spider 32 which carries a pair of sleeves 32A made of electric insulating material and which are radially directed and longitudinally-offset. Spring-loaded electric brushes 33 are slidable in sleeves 32A and are respectively electrically connected to the two electric wires 26A parallel connected to wires 26 coming from the generators 21. Obviously, all the generators 21 are connected in parallel to the contact brushes. The two brushes 33 are in sliding contact with electric contact rings 34 surrounding the same and supported by a nipple 35, made of electric insulating material and fixed inside the tubular frame 3. This system, as is well known, enables the constantly rotating wires 26A be connected to the wires 36 running down the inside of the tower despite continuous rotation of the blades 8. The assembly forms a rotary electrical contact system. The wires 36, as shown in FIG. 8, run down through a bore 37, of a vertical downward extension 38 of the frame 3. This extension is rotatably mounted in the upper end of the tower 1 through a set of conical roller bearings 39, the upper roller bearings bearing against a downwardly-facing step 40 of the frame extension 38. The lower end of the extension 38 is threaded to receive lock nuts 41, which are accessible through a tower opening 42, normally closed by an access door 43. Lock nuts 41 retain bearings 39 in proper position.

Figure 9A:
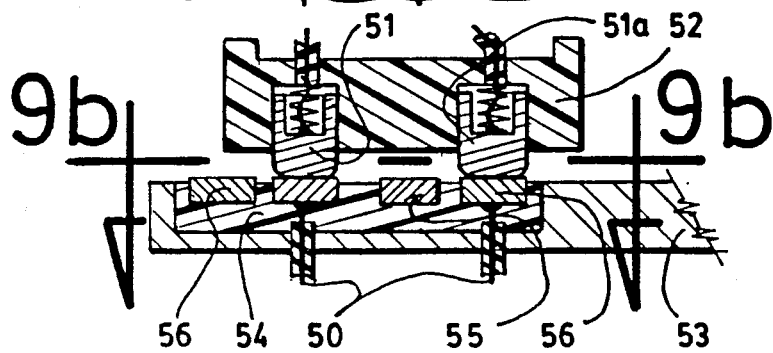
FIG. 9A is an enlarged view of the portion of FIG. 8 within area delimited by 9A.
Figure 9B:
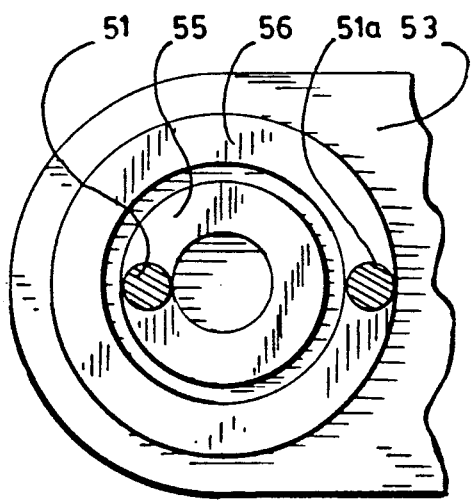
FIG. 9B is a section taken along line 9B of FIG. 9A.
Figure 13:
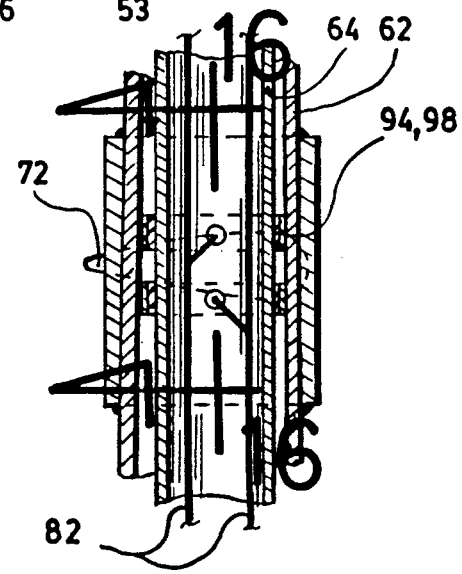

Referring to FIG. 8 and FIG. 9A, it is seen that there is provided another electrical rotary contact joint between the wires 36 extending through the frame extension 38 and the wires 50 extending down through the tower 1 to be connected to any desired electrical system or grid. As shown in FIGS. 9A and 9B, the wires 36 are respectively electrically connected to spring-loaded shoes 51, which are slidably axially mounted within a block 52, made of electrically-insulated material and fixed to the lower end of the frame extension 38.

The two shoes 51 are excentrically disposed at two different radial distances from the vertical rotational axis of the frame extension 38. An arm 53 is secured to the inside of tower 1 opposite the shoes 51 and below the same and carries a wafer 54, made of electric insulating material and carrying two rings 55, 56 with which the shoes 51, 51A are in respective sliding electrical contact. The rings 55 and 56 are connected to the wires 50.

Referring to FIG. 3A, arrow 44 indicates the true wind direction; arrow 45 the travelling direction of the main rotor blade 8; and arrow 47 indicates the direction of the lift force exerted on the airfoil blade. Angle alpha is the blade angle with respect to the blade motion. The direction of the relative wind and the angle of attack of the blade are not indicated, since this is standard.

Although the main wind component driving the secondary rotor 14 is parallel to the blade motion arrow 45, it is believed that an additional drive force is produced by the component of the wind which is deflected by the intrados 9 towards the propeller 14, as indicated by the arrows 48. This explains why it is preferable to mount the secondary rotor 14 at the trailing edge 13 of the blade 8.

Figure 10:
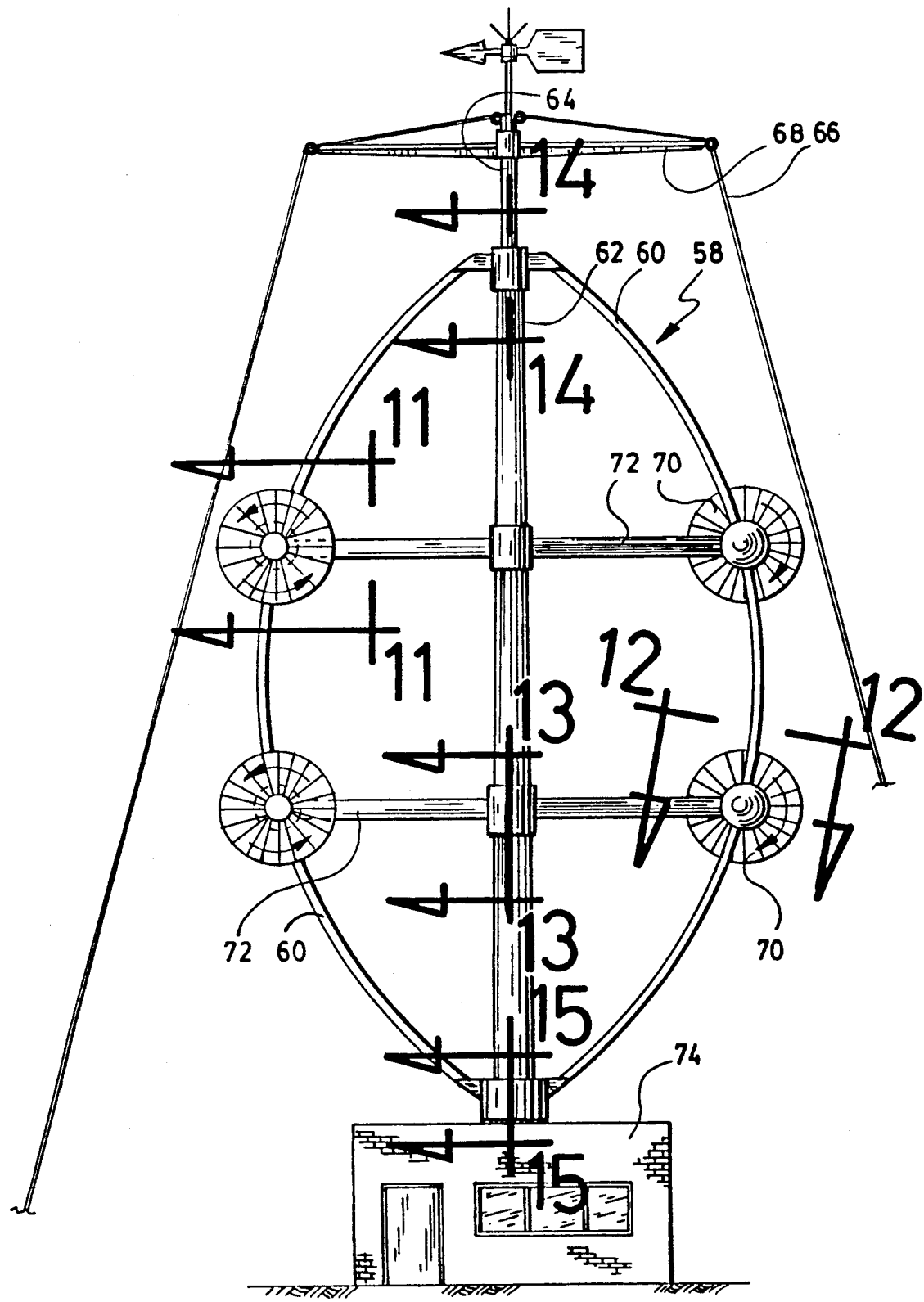
FIG. 10 is an elevation of another embodiment of the invention, namely: an egg-beater type rotor provided with the secondary rotors of the invention.

FIGS. 10 to 16 shows another embodiment of the invention, the secondary rotors being associated with a main rotor of the egg-beater type. The main rotor 58 comprises a pair of main blades 60 fixed to the upper and lower ends of a vertically-disposed tubular shaft 62 rotatably mounted on a post 64 maintained upright, for instance by guy wires 66, trained on spacing arms 68 radially fixed to the upper end of the post 64. In the embodiment shown, each main blade 60 carries at two different levels a secondary wind-driven rotor 70 directly coupled to an electric generator. As in the first embodiment, each secondary rotor 70 is rotatable about a secondary axis which is normal to the axis of rotation of the main rotor 58. As shown in FIG. 10, the secondary rotors 70 are equally distant from the main rotor shaft 62 and are symmetrically arranged with respect to shaft 62 at two different levels; the secondary rotors 70 at the same level, together with the main blade portion 60, are interconnected by bracing arms 72 to better resist the centrifugal force exerted on the secondary rotor units.

Figure 15:
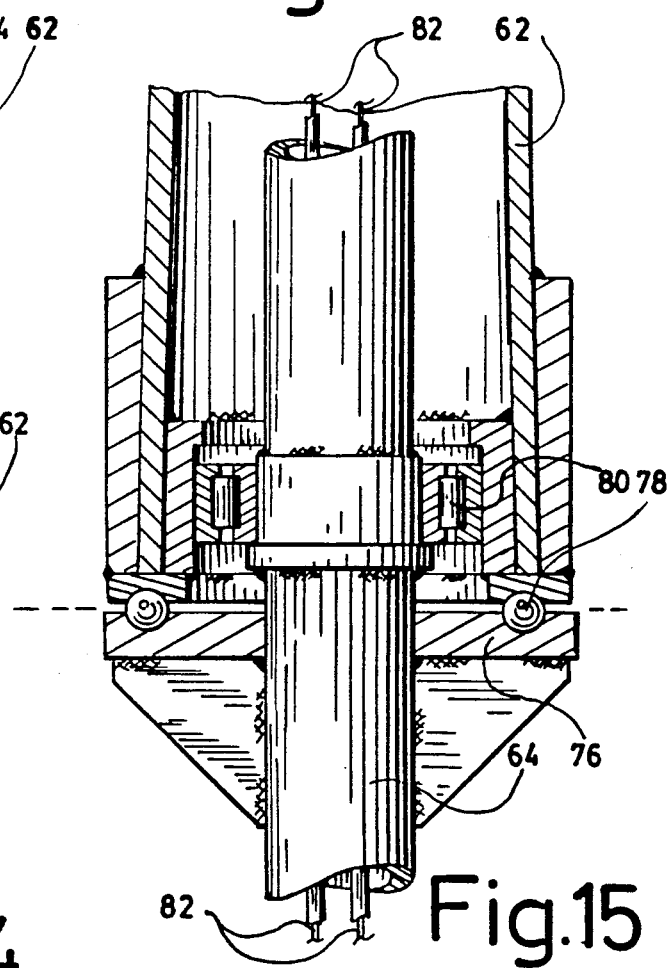

The system is mounted adjacent a servicing building 74. Referring to FIG. 15, a thrust plate 76 supports, by means of a thrust bearing 78, the lower end of the rotatable tubular shaft 62. Said shaft 62 is centered on post 64 by a radial roller bearing 80.

It is seen that post 64 is tubular and serves for the passage of the wires 82 connected to the electric generators of the secondary rotor units 70.

Figure 14:
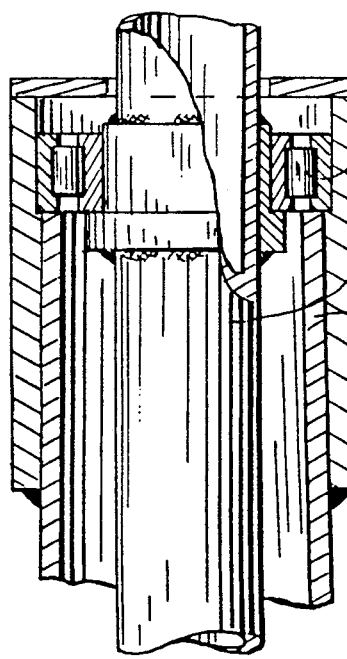

FIG. 14 shows the upper end of the post 64 and of the tubular shaft 62, wherein it is seen that the latter is rotatably centered on the post by means of another radial roller bearing 84.

Referring to FIG. 12, it is seen that, as in the first embodiment, the main blade 60 has an airfoil cross-section and that the secondary wind-driven rotor unit 70, comprises a turbine unit 17, such as in FIG. 5, or a propeller unit 17A, as in FIG. 5A. The turbine or propeller is directly coupled to the shaft of an electric generator, as in the first embodiment, and this electric generator is enclosed in a nacelle 86.

Each bracing arm 72 has preferably an aerodynamic cross-sectional shape, as shown in FIG. 11, and may be constructed in a manner similar to the main blades 8 of the rotor 6 of the first embodiment, namely with transverse partitions 88 longitudinally spaced within the skin of the arm 72 and with a longitudinally-reinforcing tube 90, in which the electrical wires 92 from the electric generators travel to the tubular shaft 62 and post 64.

Figure 16:
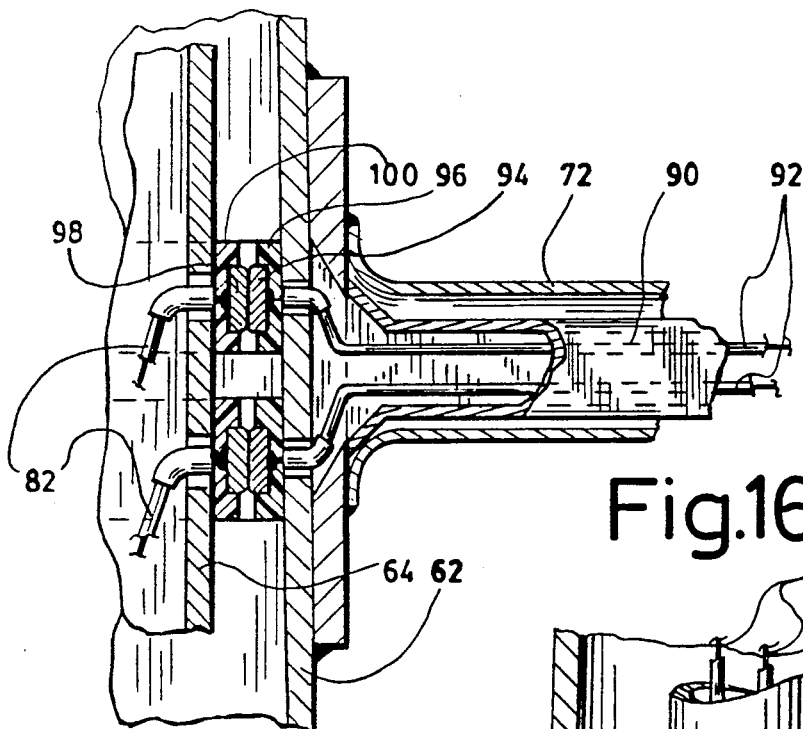
FIG. 16 is a section along line 16—16 of FIG. 13.

As shown in FIG. 16, between the wires 92 enclosed within the arm 72 and rotating therewith, and the wires 82 which run down the stationary post 64, there is a rotary electrical contact assembly to establish contacts between the sets of wire 82, 92.

A first contact ring 94 is fixed inside of a sleeve 96, made of electric insulating material and fixed to the inside of tubular shaft 62. Contact ring 64 is in slidable electric contact with a radially-inner contact ring 98 fixed on the outside of a sleeve 100, made of electrically-insulating material and fixed to the outside of the post 64. There are two sets of contact rings 94, 98, and the rings of the two sets are respectively connected to the wires 92 and 82.

Obviously, the wires 92 coming from each of the generators at the same level are all parallel connected to the outer contact ring 94.

Referring to FIG. 12, it is seen that the propeller 17 is located at the trailing edge of the main blade 60 and rearwardly spaced therefrom. As in the first embodiment, the axis of rotation of the secondary rotor is substantially parallel to the intrados of the main blade 60.

In FIG. 12, arrow 102 indicates the true wind direction and arrow 104 the direction of the lift force exerted on the blade 60.

Angle alpha indicates the attack angle of the blade 60. Arrow 106 indicates the instantaneous direction of rotation of the blade 60. As in the first embodiment, part of the air deflected against the intrados of the blade 60 serves as additional input to drive the secondary rotor 70.

I claim:

1. A wind machine comprising a wind-driven main rotor rotatable about a main axis and at least two wind-driven secondary rotors carried by said main rotor equally distant from and symmetrically arranged relative to said main axis and each rotatable about a second axis, which is substantially normal to said main axis, each secondary rotor having a smaller diameter than that of said main rotor whereby said main rotor serves to bodily move said secondary rotors through the air at a much greater speed than the wind speed to which said main rotor is exposed, said secondary rotors adapted to transmit torque to a rotary energy-producing device.

2. A wind machine as defined in claim 1, wherein said main rotor includes blades of airfoil cross-section and said secondary rotors are axial flow rotors.

3. A wind machine as defined in claim 2, wherein each axial flow secondary rotor is located at the trailing edge of said blade.

4. A wind machine as defined in claim 3, wherein each axial flow secondary rotor is a propeller and said second axis is generally parallel to the chord of said blade.

5. A wind machine as defined in claim 4, wherein said main rotor has a shaft which is horizontally disposed and further including a tower, a frame carried by the upper end of said tower for rotation about a vertical axis, said frame rotatably supporting said main rotor shaft and carrying a tail vane for orienting said main rotor into the wind.

6. A wind machine as defined in claim 1, in combination with electric generators, each electric generator constituting said rotary energy-producing device and each having a driving shaft directly coupled to an associated secondary rotor.

7. A wind machine as claimed in claim 6, wherein said main rotor includes blades of airfoil construction and said secondary rotors are axial flow rotors.

8. A wind machine as defined in claim 7, wherein each axial flow secondary rotor is located at the trailing edge of said blade.

9. A wind machine as defined in claim 8, wherein each axial flow secondary rotor is a propeller and said second axis is generally parallel to the chord of said blade.

10. A wind machine as defined in claim 9, wherein said main rotor has a shaft which is horizontally disposed and has radial blades and said secondary rotors are located at the tip portion of said blades, and further including a tower, a frame rotatably carried by the upper end of said tower for rotation about a vertical axis, said frame rotatably supporting said main rotor shaft and carrying a tail vane for orienting said main rotor into the wind.

11. A wind machine as defined in claim 9 wherein said main rotor has a vertically disposed shaft with blades interconnecting opposite ends of said shaft and having an intermediate portion radially spaced therefrom, said secondary rotors carried by said intermediate blade portions.

* * * * *